United States Patent [19]
White

[11] Patent Number: 5,397,088
[45] Date of Patent: Mar. 14, 1995

[54] VEHICULAR SUN VISOR HOLDING BRACKET

[75] Inventor: Jay R. White, Bloomfield Hills, Mich.

[73] Assignee: Jay Roberts Company, Rochester Hills, Mich.

[21] Appl. No.: 163,939

[22] Filed: Dec. 8, 1993

[51] Int. Cl.⁶ ............................................. A47F 5/00
[52] U.S. Cl. ........................... 248/309.1; 248/316.7; 248/314; 296/97.9
[58] Field of Search ............... 248/309.1, 314, 111, 248/316.1, 316.7, 221.2, 221.4, 224.4, 225.1, 231.9, 201, 316.2; 296/97.9

[56] References Cited

U.S. PATENT DOCUMENTS

| | | | |
|---|---|---|---|
| 1,398,519 | 11/1921 | Hosch | 248/316.7 |
| 2,086,928 | 7/1937 | Tiryabion | 248/305 |
| 2,161,855 | 6/1939 | Copell | 248/316.7 |
| 2,312,985 | 3/1943 | Balec | 248/221.2 |
| 2,640,672 | 6/1953 | Bedford, Jr. | 248/221.4 X |
| 2,838,265 | 6/1958 | Jackon | 248/314 |
| 3,145,005 | 8/1964 | Wester | 248/314 |
| 3,289,985 | 12/1966 | Sheiman | 248/308 |
| 4,852,839 | 8/1989 | Winter et al. | 248/225.1 |
| 4,953,064 | 8/1990 | Viertel et al. | 296/97.9 X |
| 5,056,853 | 10/1991 | Van Order | 296/97.9 |

*Primary Examiner*—Alvin C. Chin-Shue
*Assistant Examiner*—Korie H. Chan
*Attorney, Agent, or Firm*—Gifford, Krass, Groh, Sprinkle, Patmore, Anderson & Citkowski

[57] ABSTRACT

A holding bracket is provided to engage the inner rod of a vehicular sun visor. The bracket has a semispherical outer surface with a diametrical slot containing an engaging socket. The bracket eliminates exposed sharp engaging surfaces that can be hazardous and provides a stylish means for accomplishing the holding function.

5 Claims, 3 Drawing Sheets

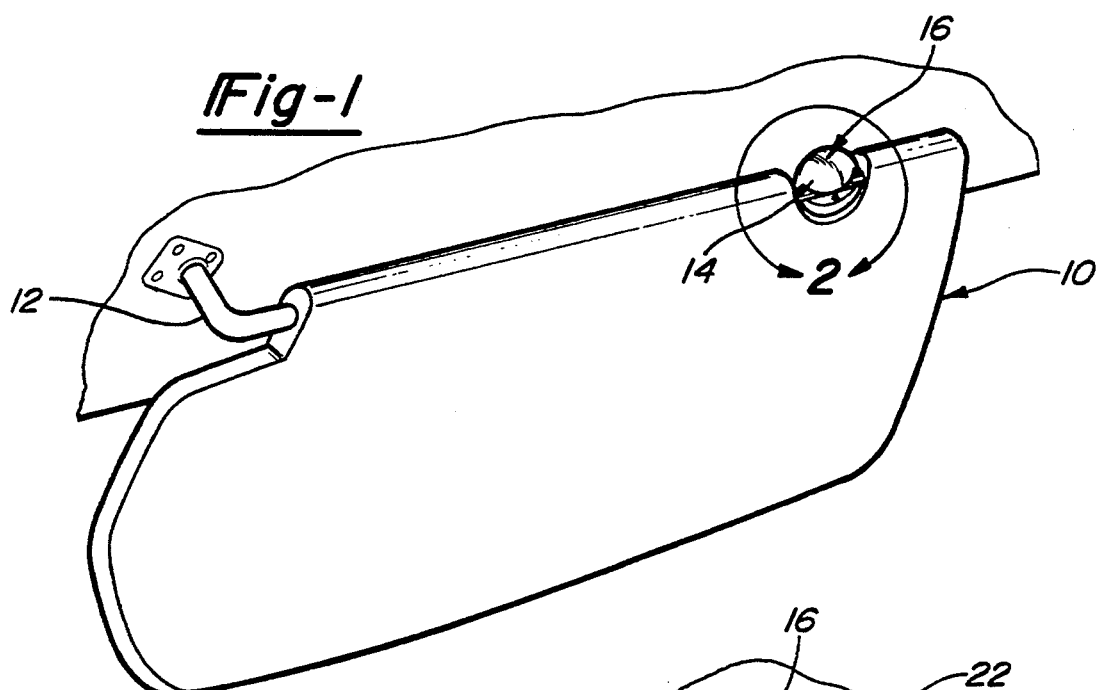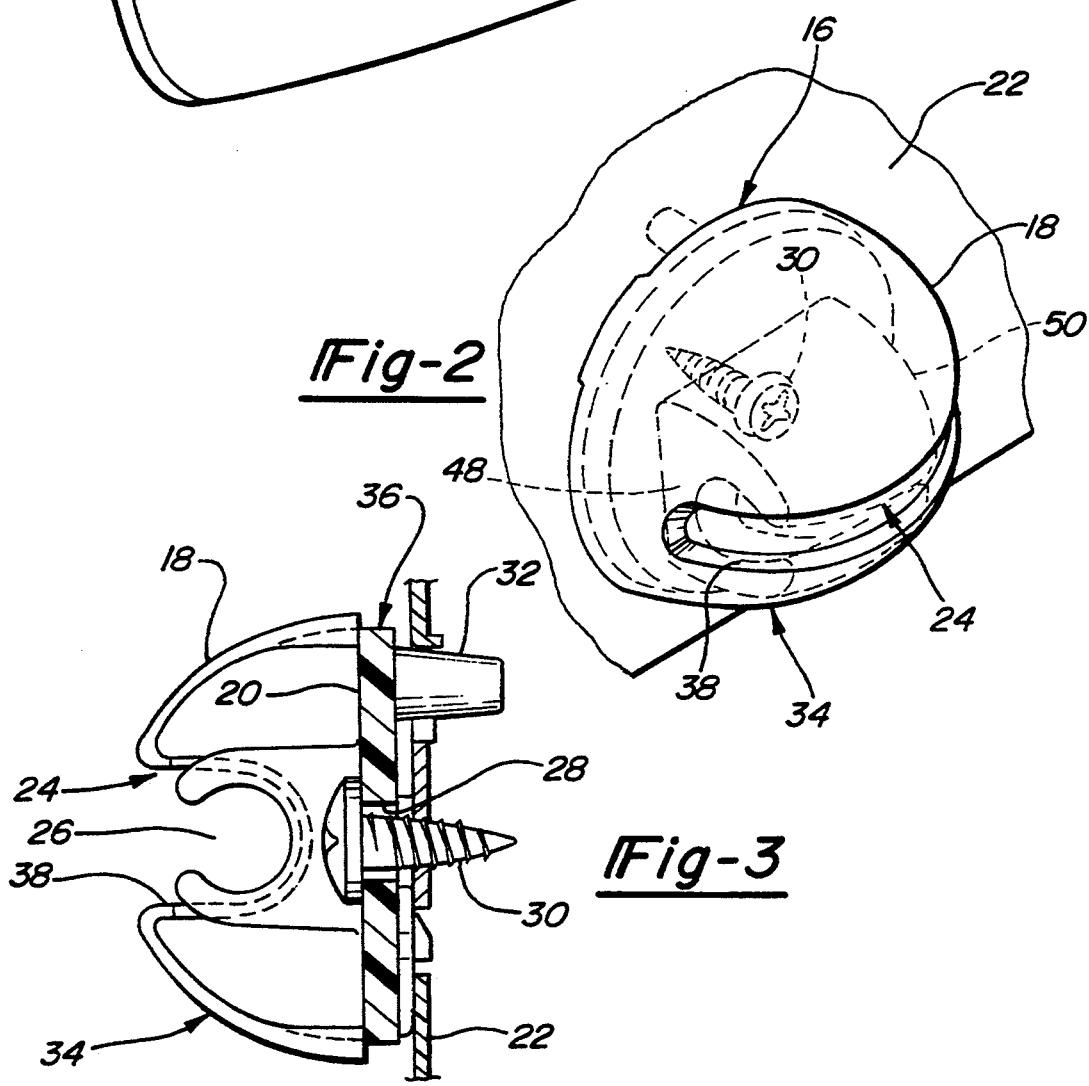

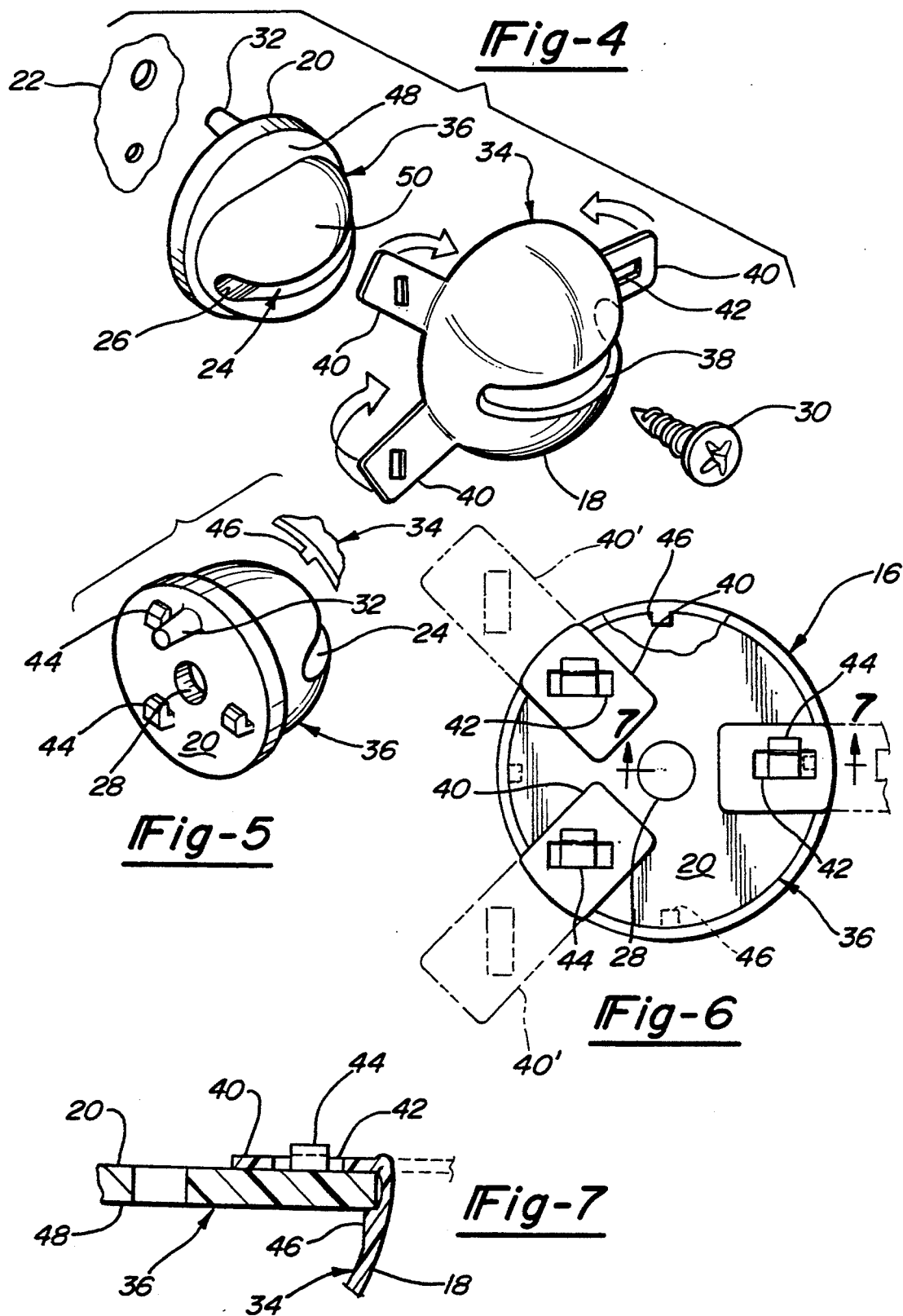

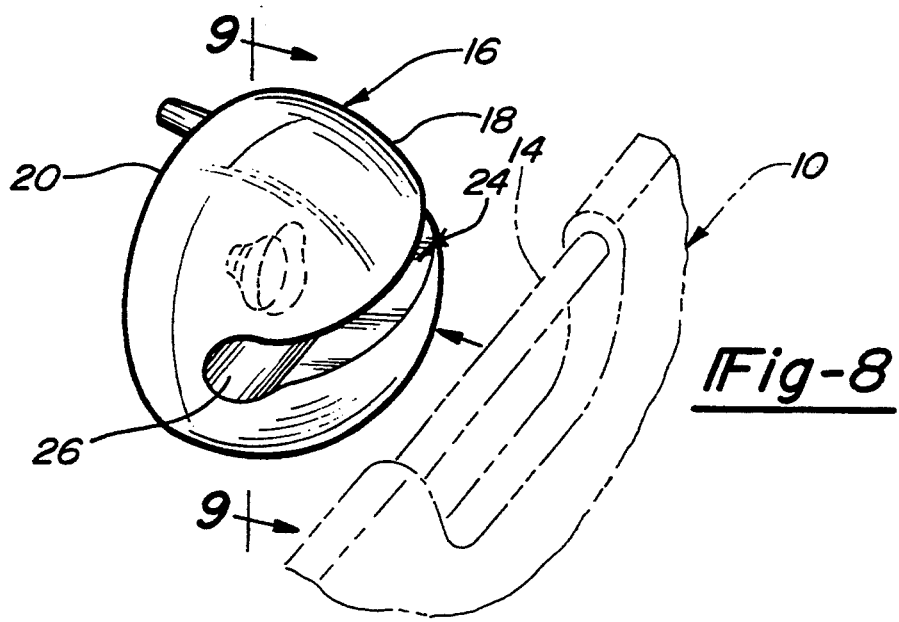
*Fig-8*
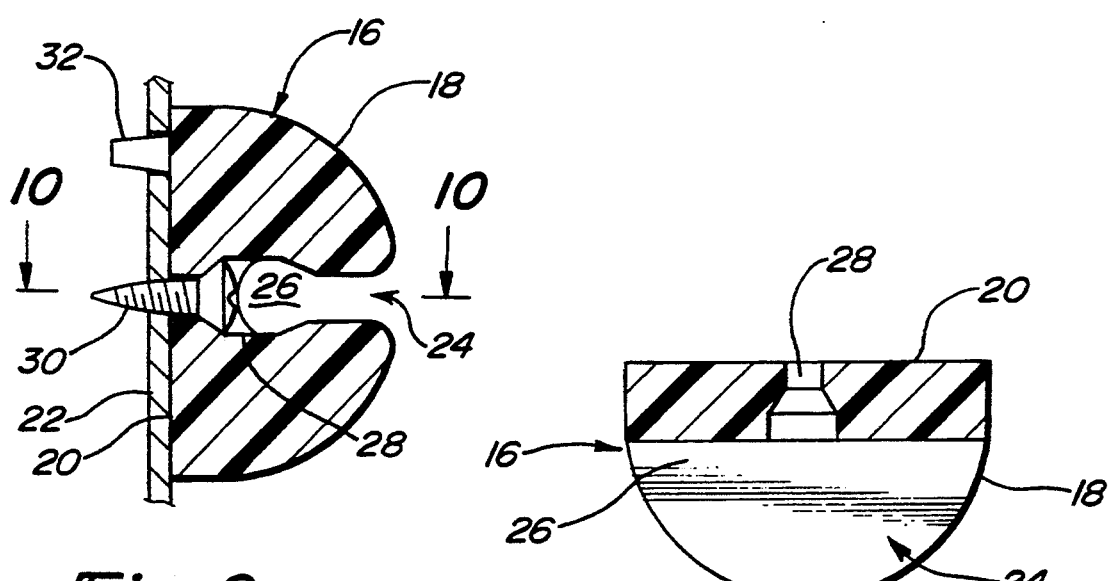
*Fig-9*
*Fig-10*

VEHICULAR SUN VISOR HOLDING BRACKET

BACKGROUND OF THE INVENTION

1. Field of the Invention

This invention relates to a vehicular sun visor, and, more particularly, this invention relates to a holding bracket for holding the inner end of the sun visor as the visor is pivoted between a use position parallel to the vehicle windshield and a storage position with the visor parallel and adjacent the vehicle roof

2. Prior Art

Typically the inner support rod of a sun visor is held by a simple hook or clip which not only presents a safety hazard but also detracts from the overall presentation of the sun visor accessory. A typical clip type presentation is shown in U.S. Pat. No. 4,953,064.

SUMMARY OF THE PRESENT INVENTION

The holding bracket of the present invention provides a recessed socket in a stylish semispherical outer bracket surface eliminating exposed sharp engaging surfaces and improving the overall aesthetic mounting of the sun visor.

The bracket has a semispherical outer surface, a body portion and a planar base for mounting the bracket against a vehicle headliner A diametrical slot is provided in the semispherical outer surface and extending into the body portion with the slot having a socket at its inner end for engaging the inner rod. An aperture in line with the slot passes through the base for receiving a mounting screw to mount the bracket to the vehicle roof structure. The base preferably has a projecting locating post which cooperates with the mounting screw for positioning and securing the bracket In one embodiment of the invention, the bracket is a one-piece structure. In another embodiment of the invention, the bracket is a two-piece structure with the outer semispherical surface being on a cover element and the body portion and planar base being on a base element. The body portion of the base element has cooperating opposed fingers which defines the base element with the socket and cover element having means for cooperatively joining the two together. In an illustrated embodiment the cover element has a plurality of attachment tabs which are molded with the cover in a radially outward direction. These tabs are bent inwardly under the semispherical outer surface. Each tab has an aperture which is aligned to receive a hook on the planar base of the base element to affix the cover element to the base element.

BRIEF DESCRIPTION OF THE DRAWING

The preferred embodiments of the invention are illustrated in the drawing in which:

FIG. 1 is a perspective view of the sun visor being held in its windshield use position by the bracket of this invention;

FIG. 2 is a perspective view of the holding bracket of this invention taken in the area encircled by the numeral 2 in FIG. 1;

FIG. 3 is a sectional view of the bracket as shown in FIG. 2;

FIG. 4 is an exploded perspective view of the bracket of this invention a shown in FIGS. 2 and 3;

FIG. 5 is another exploded perspective view of the bracket shown in FIGS. 2-4 showing the planar base surface;

FIG. 6 is a bottom view of the assembled bracket of FIGS. 2-5;

FIG. 7 is a partial sectional view taken along line 7—7 of FIG. 6;

FIG. 8 is a perspective view of an alternative embodiment showing a portion of the sun visor in exploded phantom position as it will be received into the bracket;

FIG. 9 is a sectional view taken along line 9—9 of FIG. 8; and

FIG. 10 is a sectional view taken along line 10—10 of FIG. 9.

DETAILED DESCRIPTION OF THE PREFERRED EMBODIMENTS OF THE INVENTION

Referring to FIG. 1, a vehicular sun visor 10 is shown in a driver side embodiment with a supporting pivot rod 12 extending from the left side and with a visor in its use position as it would be in front of the vehicle windshield An inward support rod 14 adjacent the right side of the visor is engaged by the holding bracket 16 of the present invention The holding bracket 16 maintains the orientation of the visor 10 as it is swung between its use position parallel to the windshield, as shown, and its storage position adjacent the vehicle headliner. A passenger side embodiment will have its pivot rod extending from the right side of the visor with the inward support rod 14 and holding bracket 16 being adjacent the left side.

The holding bracket 16 is shown in FIGS. 2-10 as having a semispherical outer surface 18 and a base element 36 with a planar base 20 for mounting the bracket against the vehicle headliner 22.

A diametrical slot 24 in the semispherical outer surface 18 having a socket means below said semispherical outer surface has a socket 26 at its inner end for engaging the inward support rod 14.

An aperture 28 in line with the slot 24 receives screw 30 for mounting the bracket to the headliner 22. A locating post 32 also extends outwardly from the planar base 20 to cooperate with the mounting screw 30 in positioning and securing the bracket 16 to the vehicle roof structure.

In the embodiment of FIGS. 2-7, the holding bracket 16 is a two piece structure having a cover element 34 and a base element 36. The semispherical outer surface 18 is on the cover element 34 with the diametrical slot 24 having a portion 38 extending through the cover element and into the body portion 50 of the base element 36 ending in the socket 26

Referring to FIG. 4, the cover element 34 is molded with three circumferentially spaced, radially extending attachment tabs 40. Each tab 40 has a slot 42 arranged to engage a hook 44 extending from the planar base 20 of base element 36 (see FIG. 5) when the tabs are bent inwardly under the cover element as shown in FIG. 6 in which the tabs are shown at 40' in phantom before being bent inwardly.

Referring to FIGS. 4-7, the cover element 34 has circumferentially spaced, inwardly directed ribs 46 against which an inner planar surface 48 of the base element 36 seats as the tabs 40 are bent around a portion of the base element under the cover element.

The slot 24 and the socket 26 extend into the body portion 50 of base element 36 in the two piece structure of FIGS. 2–7 as best seen in FIG. 4.

Referring to the embodiment of FIGS. 8–10, the bracket 16 is integrally molded so that there is no separate cover element and base element as employed in the embodiment of FIGS. 2–7.

I claim:

1. A bracket for engaging an inner rod of a vehicular sun visor for holding said rod as said rod is swung between a storage and use position, said bracket comprising:
- a semispherical outer surface having a diameter, a body portion having a socket means below said semispherical outer surface, and a planar base for mounting against a vehicle headliner;
- a diametrical slot in said semispherical outer surface, said slot extending symmetrically along the entire length of said diameter and into said body portion socket means for engaging said inner rod;
- an aperture in said body portion in line with a midpoint of said slot and passing through said base; and
- a mounting screw received in said aperture.

2. The bracket according to claim 1 wherein said socket means extends along said slot at an inner end of said slot.

3. The bracket according to claim 1 including a locating post projecting from said planar base for extending through vehicle roof structure along with said mounting screw for positioning and securing said bracket.

4. The bracket according to claim 1 wherein said semispherical outer surface is on a cover element and said body portion and said planar base are on a base element, said body portion having opposed fingers defining said socket means, and said cover element and said base element having cooperating joining means for affixing said cover element to said base element.

5. The bracket according to claim 4 wherein said cover element has a plurality of attachment tabs directed inwardly under said semispherical outer surface, each containing an aperture aligned to receive a hook projecting from said planar base for affixing the cover element to the base element.

* * * * *

UNITED STATES PATENT AND TRADEMARK OFFICE
CERTIFICATE OF CORRECTION

PATENT NO. : 5,397,088
DATED : March 14, 1995
INVENTOR(S) : Jay R. White

It is certified that error appears in the above-indentified patent and that said Letters Patent is hereby corrected as shown below:

Column 1, line 12, after "roof" insert a period.

Column 1, line 28, after "headliner" insert a period.

Column 1, line 31, after "socket" insert --in the body portion--.

Column 1, line 37, after "bracket" insert a period.

Column 1, line 68, after "invention" delete --a--.

Column 2, line 22, after "windshield" insert a period.

Column 2, line 25, after "invention" insert a period.

Column 2, lines 39 & 40, after "18" delete --having a socket means below said semispherical outer surface--.

Column 2, line 39, after "18" insert --extends symmetrically along its entire diameter into the body portion 50 of the base element 36 and--.

Column 2, line 54, after "26" insert a period.

UNITED STATES PATENT AND TRADEMARK OFFICE
CERTIFICATE OF CORRECTION

PATENT NO. : 5,397,088
DATED : March 14, 1995
INVENTOR(S) : Jay R. White

It is certified that error appears in the above-indentified patent and that said Letters Patent is hereby corrected as shown below:

Column 2, line 61, after "shown" insert --in phantom-- and after "40'" delete --in phantom--.

Signed and Sealed this

Ninth Day of July, 1996

Attest:

BRUCE LEHMAN

*Attesting Officer*  *Commissioner of Patents and Trademarks*